(No Model.)

W. H. BLAKE, 2d & E. T. BRADLEY.
FLEXIBLE RULE.

No. 447,657. Patented Mar. 3, 1891.

Witnesses:

Inventors
William H. Blake 2nd &
Edward T. Bradley
By James Sheehy Attorney

UNITED STATES PATENT OFFICE.

WILLIAM H. BLAKE, 2D, AND EDWARD T. BRADLEY, OF SWANTON, VERMONT.

FLEXIBLE RULE.

SPECIFICATION forming part of Letters Patent No. 447,657, dated March 3, 1891.

Application filed June 26, 1890. Serial No. 356,791. (No model.)

*To all whom it may concern:*

Be it known that we, WILLIAM H. BLAKE, 2d, and EDWARD T. BRADLEY, citizens of the United States, residing at Swanton, in the county of Franklin and State of Vermont, have invented certain new and useful Improvements in Flexible Rules; and we do declare the following to be a full, clear, and exact description of the invention, such as will enable others skilled in the art to which it appertains to make and use the same.

This invention has relation to flexible rules, and is designed as an improvement upon the devices shown and described in the Letters Patent granted to us July 31, 1888, No. 386,869.

The invention will be fully understood from the following description and claims, when taken in connection with the annexed drawings, in which—

Figure 1:
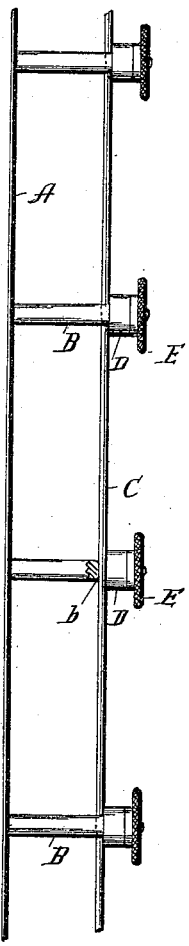
Figure 2:
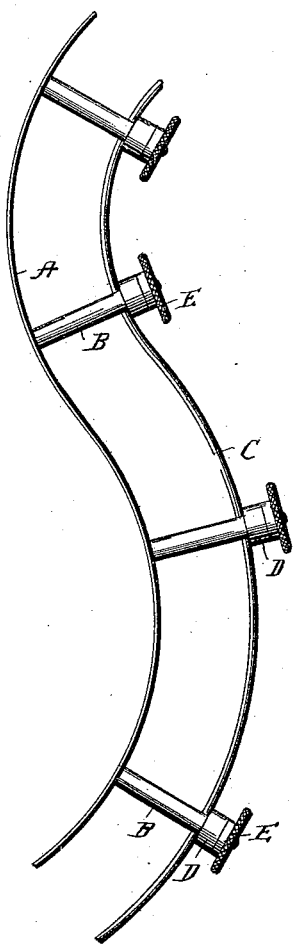
Figure 3:
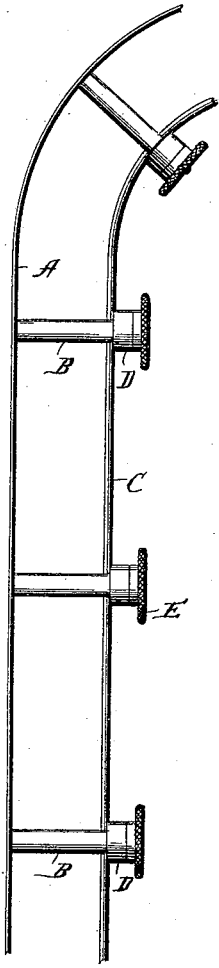
Figure 4:
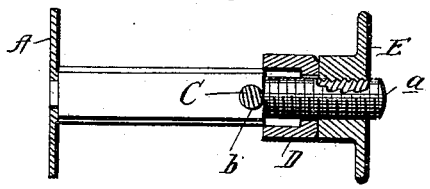

Figure 1 is a plan view of our improved rule, showing the same in a position to draw a straight line. Fig. 2 is a similar view showing the rule in a position to lay off a compound curve, and Fig. 3 is a similar view showing the device in a position to draw a straight line and a curve. Fig. 4 is a cross-sectional view of the rule, taken through the plain nut and jam-nut.

In carrying out our improvements we take a flexible face-strip A, which may be of metal, preferably spring-steel, gutta-percha, vulcanized rubber, or other suitable material, which may be graduated in the ordinary manner. We then secure to the rear side of said strip at suitable intervals posts B and firmly fix the same thereto. These posts terminate at their outer ends in reduced externally-threaded portions $a$, and at the base of said threaded portion is a transverse aperture $b$.

C indicates a rod of spring-steel or other suitable material, which is designed to move in the apertures $b$ of the posts B and fix the face-strip in any suitable position or curvature, as will be presently explained.

D indicates a plain nut, which is arranged upon the threaded portion $a$ of the post, and is designed to impinge upon the rod C and bind the same to the post when the face-strip has been shaped in the position desired.

E indicates a jam-nut also carried by the post B and designed to pinch the plain nut D upon the flexible rod C. These jam-nuts E have a milled head, as shown, and are preferably of a diameter equal to the width of the face-strip, so that when the latter has been placed upon edge to draw a line the jam-nuts will bear upon the object and steady the face-strip in position.

A device as thus constructed is light and durable and may be manufactured at a small expense compared with rules such as at present in use. The parts are very effective in operation, and by the employment of the plain nut and jam-nut in connection with the rod we are enabled to get a quick and accurate adjustment of the parts and a larger holding power upon the fixing-rod.

Having described our invention, what we claim is—

1. As an improved article of manufacture, a rule or scribing device consisting, essentially, of a flexible face-strip having guide-posts on its rear side, a flexible rod movable in said guides, a plain nut on the posts, and a jam-nut for pinching the plain nut on the rod, substantially as specified.

2. A rule or scribing device having a flexible face-strip, in combination with posts fixed to the rear side thereof and their outer ends terminating in threaded reduced portions, and also having guide-apertures, a plain nut arranged on the threaded portion, and a jam-nut also arranged thereon and being of a diameter equal to the face-strip, substantially as specified.

3. A rule or scribing device consisting of a flexible face-strip having guide-posts on its rear side, a flexible rod movable in said posts, the guides terminating in a reduced threaded portion, and a nut for fixing the flexible rod to the guides, substantially as specified.

In testimony whereof we affix our signatures in presence of two witnesses.

WILLIAM H. BLAKE, 2D.
EDWARD T. BRADLEY.

Witnesses:
CHARLES L. WARD,
MICHAEL CRONIN.